April 3, 1928.  1,665,094

C. HENRY

TIRE BOOT

Filed Oct. 3, 1927

Claude Henry
INVENTOR

BY

WITNESS:   ATTORNEY

Patented Apr. 3, 1928.

1,665,094

UNITED STATES PATENT OFFICE.

CLAUDE HENRY, OF FLINT, MICHIGAN.

TIRE BOOT.

Application filed October 3, 1927. Serial No. 223,759.

This invention relates to tire boots, and its general object is to provide a boot or blow out patch, for use in connection with pneumatic tires, to strengthen the casing of the tire at a weak place or to cover a hole or opening therein, so as to prevent bulging of the casing and to protect the inner tube against punctures and blow outs.

A further object of the invention is to provide a tire boot that includes in its construction connected metallic links providing a chain vulcanized in rubber, with the rubber extending through the links so as to retain the chain properly secured which together with tire casing bead engaging anchoring means secured to the lateral end links of the chain prevent creeping of the boot in the casing as well as to amply protect the tube, as the part of the casing receiving the boot will be the strongest in its circumference.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figures 1, 2:
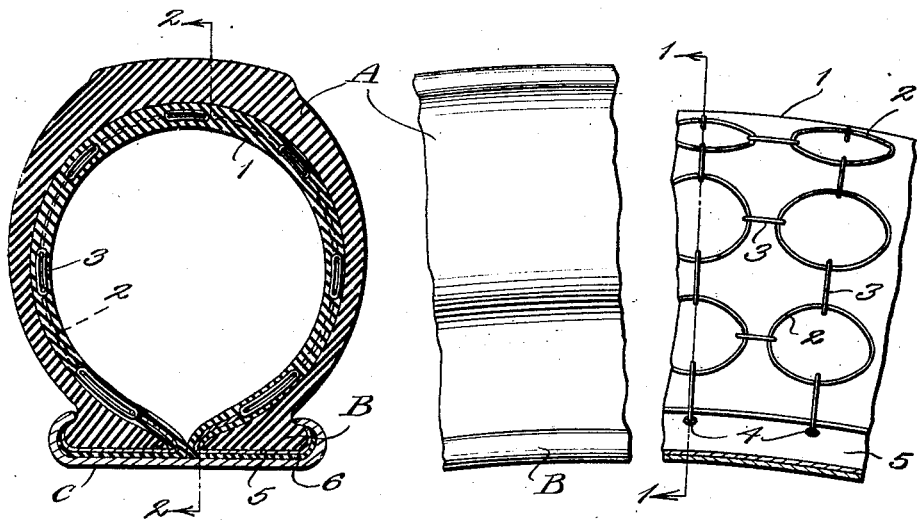
Figure 1 is a fragmentary sectional view taken approximately on line 1—1 of Figure 2 looking in the direction of the arrows.
Figure 2 is a fragmentary sectional view taken approximately on line 2—2 of Figure 1, looking in the direction of the arrows.

Referring to the drawings in detail the letter A indicates a tire casing having the usual beads B formed therewith, as best shown in Figure 1 of the drawings.

The boot or blow out patch which forms the subject matter of the present invention includes a body 1 curved transversely upon itself to follow the transverse curvature of the tire and is of course longitudinally curved to likewise follow the circumferential curvature of the tire. The body 1 is formed from rubber and may be covered with fabric as will be apparent.

Embedded within the body 1 and vulcanized therein in a manner whereby the rubber of the body is arranged in the links thereof is a chain which includes relatively large substantially circular links 2 connected together through the instrumentality of relatively small elongated substantially flat links 3. The circular links 2 are curved upon themselves as shown, and receive the links 3 at diametrically opposite sides thereof, with the result the links are properly secured to each other to provide a strong and sturdy chain as will be apparent.

The chain terminates in small links at its sides and large links at its ends as best shown in Figure 2 of the drawings, and secured to the terminating small links through the medium of openings 4 are anchor plates 5 which are substantiallly U-shaped in cross section to follow the shape of the bead of the casing and are likewise vulcanized to flanges 6 formed with the body so as to space the anchor plates from the casing receiving rim C in the manner as best shown in Figure 1 of the drawings.

From the above description and disclosure of the drawings, it will be obvious that the boot or blow out patch is adapted to be disposed in the casing to overlie a weakened portion, blow out hole, or opening in the casing and due to the chain which is embodied in the body, it will be apparent that the boot will be substantially reinforced and practically make the weakened portion or portion having the hole or opening therein the strongest in the circumference of the casing, when the boot is applied therein as shown in Figure 1 of the drawings. The novel construction of the anchor plates which as above set forth follow the shape of the beads of the casing as well as a portion of the inner side of the casing, preventing creeping of the boot and retaining the same in fixed relation to the casing. The anchor plates are capable of yielding slightly in order to follow the movement of the bead and casing so that they will not damage the same.

While I have shown and described the chain embedded and vulcanized in the body of a boot for a tire, it will be apparent that a chain of the same construction and configuration as above described may be embedded and vulcanized in the body of a tire casing itself. This construction will result in reinforcing the entire tire casing and prevent blow outs and the like.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A tire boot of the character described comprising an elastic body, a chain vulcanized in said body, and anchor plates adapted to receive the bead of a tire casing and secured to said chain.

2. A tire boot of the character described comprising an elastic body shaped to follow the transverse and circumferential curvature of the tire casing, a chain including relatively large links and relatively small links connecting the large links, and substantially U-shaped anchor plates secured to the end side links.

3. A tire boot of the character described comprising a body, flanges formed with said body, a chain vulcanized in said body terminating in relatively small end links at its sides, substantially U-shaped anchor plates having openings therein to receive the said end links and being adapted to receive the beads of a tire casing for securing the body with its chain within the tire casing.

4. A tire boot of the character described comprising an elastic body curved transversely and longitudinally to follow the curvature of a tire casing, a chain vulcanized within the body, opposed flanges formed with the confronting ends of said body, and anchor plates adapted to receive the beads of the tire casing and being secured to the chain and flanges respectively.

5. A tire protector comprising in combination with an elastic body, a chain vulcanized in said body and substantially U-shaped anchor plates extending along opposite side edges of the body and secured to the chain.

In testimony whereof I affix my signature.

CLAUDE HENRY.